United States Patent [19]

Beardsley et al.

[11] Patent Number: 5,588,507

[45] Date of Patent: Dec. 31, 1996

[54] AIRCRAFT BRAKE ASSEMBLY PROVIDING ADDITIONAL WEARABLE FRICTION MATERIAL

[75] Inventors: George C. Beardsley, South Bend, Ind.; Brian K. Berk, St. Joseph, Mich.; Albert E. Kartman, South Bend, Ind.; Stanley W. May, Mishawaka, Ind.; Douglas J. Wise, South Bend, Ind.; Michael J. Zarembka, Granger, Ind.

[73] Assignee: AlliedSignal, Inc., Morristown, N.J.

[21] Appl. No.: 529,260

[22] Filed: Sep. 15, 1995

[51] Int. Cl.⁶ ........................................ F16D 55/24
[52] U.S. Cl. ........................... 188/71.5; 188/72.5
[58] Field of Search ................. 188/71.5, 73.2, 188/72.4, 72.5; 244/111, 1101

[56] References Cited

U.S. PATENT DOCUMENTS

| | | | |
|---|---|---|---|
| 2,888,101 | 5/1959 | Bayles | 188/72.5 |
| 3,312,313 | 4/1967 | Moyer | 188/72.5 |
| 4,195,714 | 4/1980 | Massing | 188/71.5 |

FOREIGN PATENT DOCUMENTS

| | | | |
|---|---|---|---|
| 2326623 | 6/1977 | France | 188/73.2 |

OTHER PUBLICATIONS

Alliedsignal Inc. F-15 Brake Assembly Drawing 2605692-1, 1978.

Alliedsignal Inc. F-15 Brake Assembly Drawing 2606005, 1976-77.

*Primary Examiner*—Matthew C. Graham
*Attorney, Agent, or Firm*—Larry J. Palguta; Leo H. McCormick, Jr.

[57] ABSTRACT

An aircraft brake assembly (10) comprises a torque tube (12) connected with a piston housing (14), and a heat sink (50) comprising friction material stator discs (22, 24, 26, 28, 30) connected non-rotatably with the torque tube (12) and friction material rotor discs (40) for connection with a wheel. The piston housing (14) includes a plurality of circumferentially spaced-apart pistons (16) for compressing the heat sink (50) during braking. Because of size limitations imposed upon the piston housing (14), fluid passages (23) in the piston housing (14) are offset or cross-drilled and terminate at piston housing bosses (15) located circumferentially between the pistons (16) and facing the pressure plate or adjacent friction material stator disc (30). The adjacent friction material stator disc (30) includes a recess(es) (60, 61), either a continuous annular groove (60) or a series of pockets (61), for receiving either the bosses (15) and ends (17) of the pistons (16) or just the bosses (15), thereby enabling an increase in the overall axial length ("X") of the heat sink (50) to provide additional wearable friction material and an increase in potential landings per brake overhaul.

7 Claims, 3 Drawing Sheets

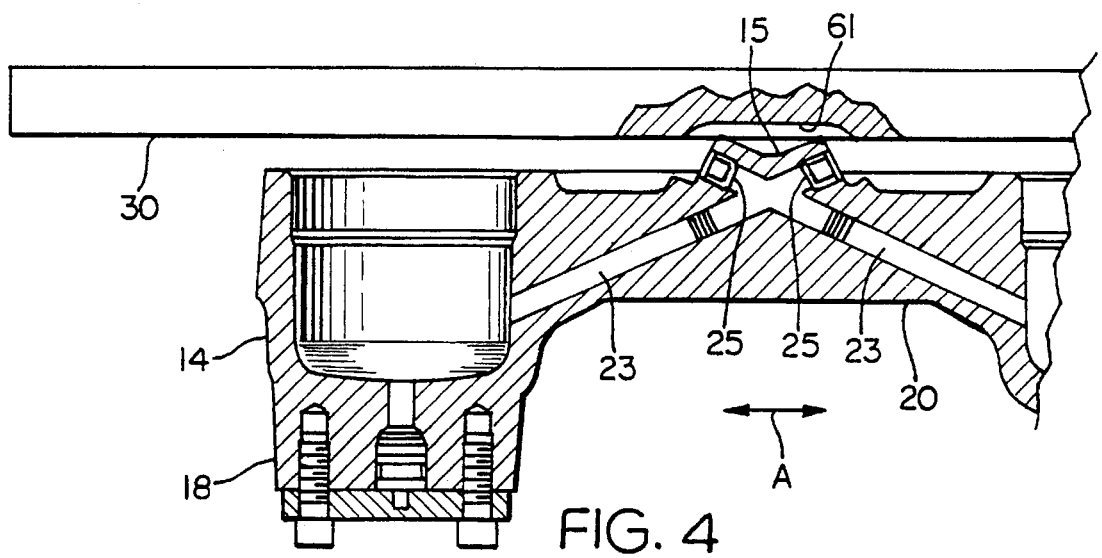
FIG. 4
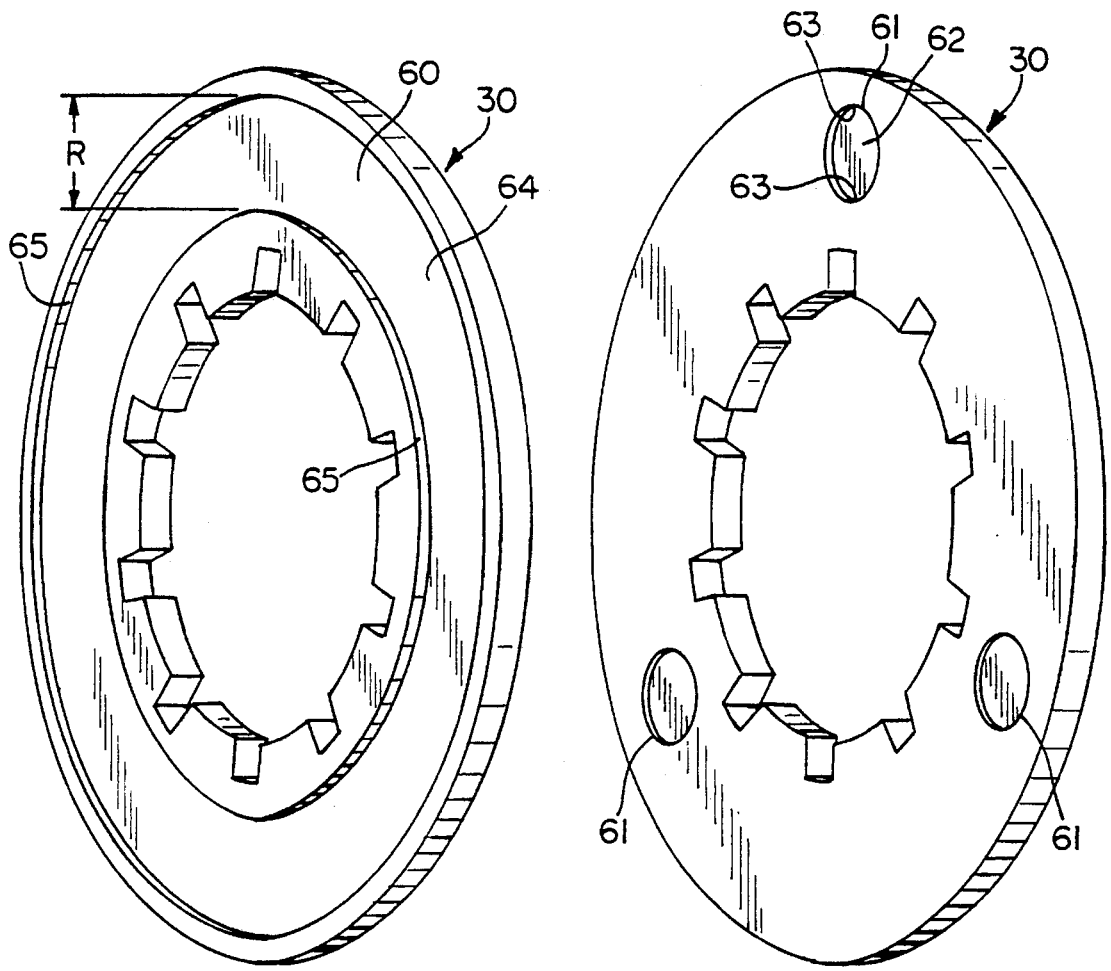
FIG. 3
FIG. 5

AIRCRAFT BRAKE ASSEMBLY PROVIDING ADDITIONAL WEARABLE FRICTION MATERIAL

The present invention relates generally to an aircraft brake assembly and in particular to an aircraft brake assembly providing additional wearable friction material.

Aircraft brake assemblies comprising a piston housing, torque tube, rotor and stator discs, are generally mounted on an axle of the aircraft. In aircraft brake assembly designs having stringent envelope limitations and technical performance requirements, the configurations of various parts of the brake assembly may have to be altered to meet these envelope limitations and performance requirements. For brake assembly designs wherein the landing gear limits the amount of space available for the webbing, ribs or bridges of the piston housing that include fluid passages and extend between the piston domes, particularly in the area of the axle and torque lugs, it may be necessary to utilize the offsetting or cross-drilling of fluid passages in the piston housing between the piston domes rather than the typical straight through drilled passages. The fluid passages are necessary for the distribution of hydraulic brake fluid to all of the piston assemblies. If the offset or cross-drilled passages have to be made from the heat sink or heat stack side of the piston housing because of the above-mentioned limitations, then one or more bosses will extend axially from the piston housing and toward the heat stack envelope. The bosses are necessary structure that provides locations both for the drilling of the offset or crosspassages and enough housing material for passage end plugs to be inserted and retained. However, such housing bosses comprise axial extensions of the piston housing and require that the total axial length of the heat stack be shortened whereby the pressure plate disc of the heat stack is spaced-apart from the piston housing an axial distance sufficient to prevent any engagement therebetween. Such engagement would damage the pressure plate disc. This design results in a shorter overall axial length of the discs (rotors and stators) of the heat stack, and the shorter overall axial length of the heat stack translates to a decrease in the number of landings per overhaul provided by the heat stack. In aircraft brake assembly designs where the dimensional and structural limitations may require the use of offset or cross-drilled passages that result in piston housing bosses being located on the heat stack side of the piston housing, it is highly advantageous to provide a structure whereby the bosses or axial extensions do not result in a decrease in the overall axial length of the heat stack and thereby provide additional wearable friction material and extended landings per overhaul as compared to a shorter overall axial length heat stack.

The present invention provides solutions to the above by providing an aircraft brake assembly with increased wearable friction material, comprising a torque tube connected with a piston housing, friction material stator discs connected with the torque tube and friction material rotor discs for connection with a wheel, and the piston housing including a plurality of pistons for direct engagement with an adjacent friction material stator disc and a piston housing axial extension extending from the piston housing toward the adjacent friction material stator disc, the adjacent friction material stator disc including a recess for receiving the axial extension of the piston housing, the recess comprising a radially extending surface bounded in section view by radially spaced-apart axially extending edges of the recess, whereby an overall axial length of the discs is increased to provide additional wearable friction material.

The invention is described in detail with reference to the drawings which illustrate:

FIG. 3 is a perspective view of an adjacent friction material stator disc or pressure plate including a recess of one embodiment of the invention;

FIG. 4 is a partial section view of a recess of a second embodiment of the invention;

FIG. 5 is a perspective view of an adjacent stator disc or pressure plate including a plurality of circumferentially spaced-apart recesses or pockets of the second embodiment of the invention.

Figure 1:
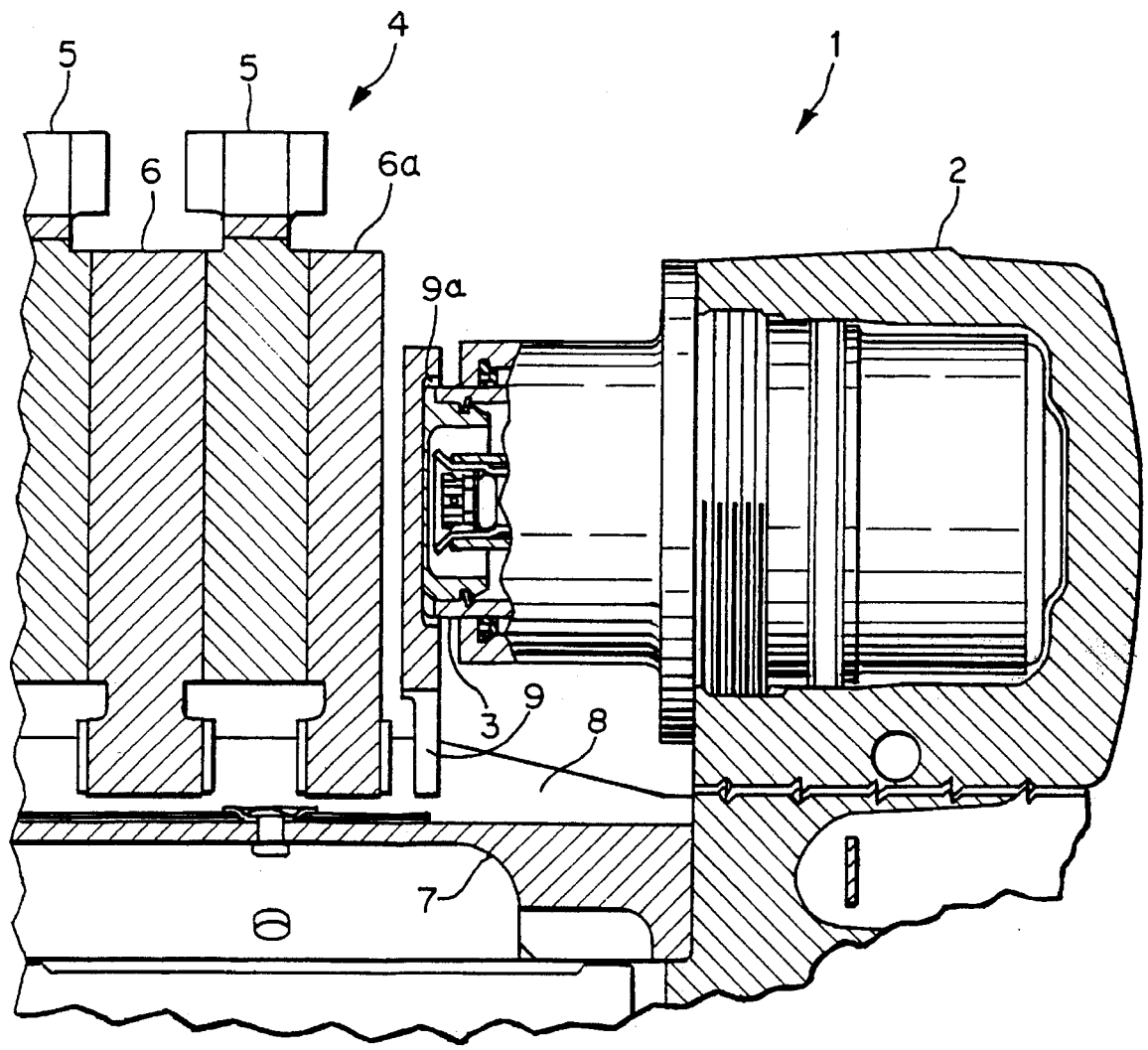
FIG. 1 is a section view of a prior art brake assembly.

FIG. 1 is a section view of a prior art brake assembly 1 that includes a piston housing 2 with a plurality of circumferentially spaced-apart piston assemblies 3 that compress a brake stack 4. Brake stack 4 includes rotor discs 5 for attachment to a wheel (not shown) and stator discs 6 attached non-rotatably with splines 8 of torque tube 7. A separate, nonfriction material, metal pressure plate 9 is located between piston assemblies 3 and the friction material pressure plate 6a. Plate 9 includes a plurality of pockets 9a each of which receives the end of an adjacent piston assembly 3. Depending on the type of material and process used in the manufacture of the friction material discs, it is possible for the piston assemblies 3 to damage the friction material pressure plate 6a during braking. In order to prevent the piston assemblies from contacting directly and damaging friction material pressure plate 6a, the additional, nonfriction material, metal pressure plate 9 is provided to distribute the piston loads imposed during braking on friction material pressure plate 6a. Metal plate 9 not only prevents direct contact between the piston assemblies 3 and friction material pressure plate 6a, but also decreases the overall axial length of the heat stack 4 so that, correspondingly, the number of potential landings per brake overhaul is decreased.

Figure 2:
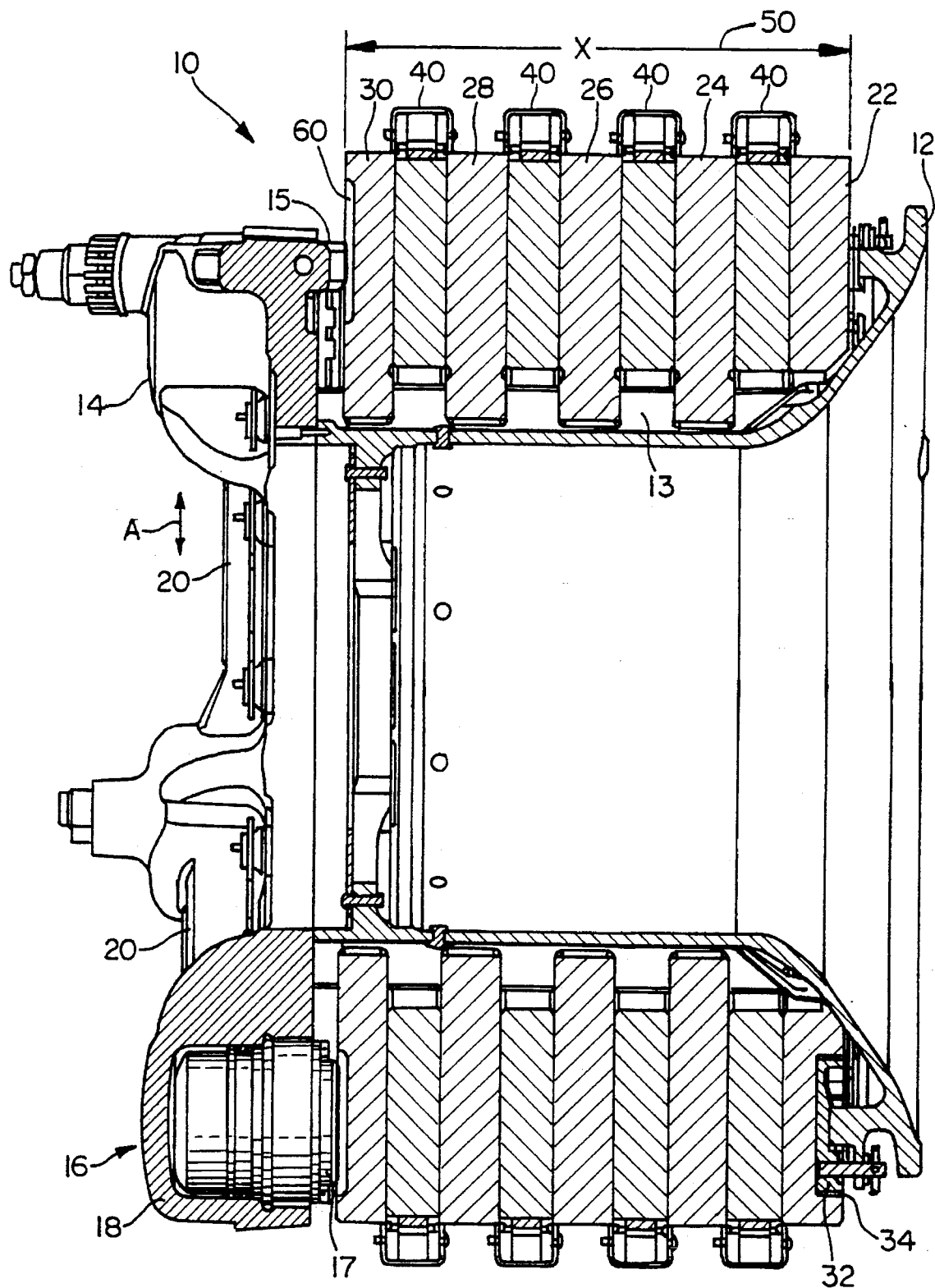
FIG. 2 is a section view of an aircraft brake assembly including the present invention.

FIG. 2 illustrates a section view of an aircraft brake assembly designated generally by reference numeral 10. Brake assembly 10 includes a torque tube 12 connected to a piston housing 14, the piston housing including a plurality of circumferentially spaced-apart piston assemblies designated generally by reference numeral 16 received within respective piston domes 18, and the piston domes 18 being connected to one another by piston housing webbing, ribs or bridges 20 having one or more axial dimensions. Brake assembly 10 further includes a plurality of friction material stator discs 22, 24, 26, 28, and 30, whereby discs 24, 26, 28, and 30 are connected non-rotatably in known fashion to the splines 13 of torque tube 12. Disc 22 is connected non-rotatably to torque tube 12 via torque pads 32 received in disc pockets 34. Friction material rotor discs 40 of brake assembly 10 are positioned alternately between the friction material stator discs and are for connection with a rotatable wheel (not shown). The friction material stator disc 22 is commonly referred to as the backing plate and the friction material stator disc 30 is commonly referred to as the pressure plate. The discs have sufficient strength so that the piston assemblies 16 may engage directly friction material pressure plate 30. The friction material stator and rotor discs together comprise a heat sink or heat stack 50 which provides the friction material portion of brake assembly 10. Obviously, if the overall axial length of the heat stack indicated by length "X" is maximized for the amount of room available within the envelope that it occupies, then a maximum number of potential landings per overhaul can be achieved by the heat stack or heat sink 50. Likewise, if the overall axial dimension "X" of the heat stack 50 is decreased, the corresponding number of potential landings per overhaul for the heat sink 50 will be decreased.

In aircraft brake assembly designs having stringent envelope geometries and technical performance requirements, it may be necessary to reduce the size of the piston housing at various locations. For example, landing gear structure may require that certain space normally occupied by the piston housing be limited to a minimum, such as at webbing, ribs or bridges 20 and particularly in the area where the axle and torque lugs of the brake are located. Thus, it may be necessary to alter the basic structure of the piston housing. Typically, a piston housing 14 can include fluid passages that are drilled straight through the piston housing and between respective piston domes 18, such as in the directions of double-headed arrow A in FIG. 2. However, because of the above-mentioned space limitations pertaining to the piston housing, it may be necessary to utilize the offsetting or cross-drilling of the fluid passages. Offsetting or cross-drilling of the fluid passages requires that at least one or more axially extending piston housing bosses 15 be present to provide a sufficiently strengthened location for the drilling of the passages and for the retention of end plugs placed in the holes (see FIG. 4 for an example of cross drilled passages 23). The axially extending piston housing boss or bosses 15 may have to be located on the heat sink side of piston housing 14 because of the above-mentioned envelope limitations. As illustrated in FIG. 4, such piston bosses 15 provide a location for offset or cross-drilled passages 23 and also provide the necessary strength for end plugs 25 when the passages are plugged. FIGS. 2 and 4 illustrate that the boss or bosses 15 extend axially from the piston housing 14 such that during assembly and prior to, during, or after braking (if the brake could even be assembled) the boss(es) 15 would engage the stator disc or pressure plate 30 and effect structural damage to the disc. If the brake assembly structure is modified so that the pressure plate 30 remains an appropriate distance from boss(es) 15 to prevent interference therewith, the result is a decrease in the overall axial length "X" of the heat sink and a corresponding decrease in the potential number of landings per overhaul. Because it is undesirable to decrease the number of landings per overhaul and thus require overhauls of the heat sink and brake assembly after shorter time periods, it is highly desirable to provide a brake assembly with axially extending housing bosses which do not cause a decrease in the amount of wearable friction material. The friction material rotor and stator discs can comprise either carbon/carbon composite discs or steel discs engaging discs with friction material attached thereto such as in typical well-known steel brakes. The present invention provides a solution to the above problems by providing in the adjacent friction material stator disc or pressure plate 30 a recess which receives therein the boss or bosses 15 so that the overall axial length "X" of the heat sink 50 may be maximized and thereby provide, by comparison, additional or increased wearable friction material and a correspondingly increased number of landings per overhaul. The recess may comprise either an individual recess or pocket 61 in pressure plate 30 if only one housing boss 15 is present, or a plurality of pockets 61 located circumferentially spaced-apart from one another and receiving the housing bosses (see FIGS. 4 and 5), or may comprise a continuous annular groove 60 so that circumferential alignment of the pockets with the housing bosses is not necessary (see FIGS. 2 and 3).

Referring to FIG. 5, the recesses 61 may be circumferentially spaced-apart from one another and will receive therein the respective housing bosses 15. Recesses 61 each comprise a radially extending surface 62 bounded in section view by radially spaced-apart axially extending edges 63. Alternatively, recess 60 may be a continuous annular groove as illustrated in FIGS. 2 and 3 whereby the recess(es) need not be aligned circumferentially with the axial extension(s) 15. Recess 60 comprises a radially extending surface 64 bounded in section view by radially spaced-apart axially extending edges 65. Likewise, recess 60 in FIGS. 2 and 3 may be of sufficient radial length "R" such that the recess receives both piston housing axial extensions 15 and piston ends 17 to enable the use of longer pistons 16, thereby providing for an increased overall piston stroke.

The present invention provides significant advantages for aircraft brake assemblies subject to the aforementioned dimensional and performance limitations. The present invention provides a solution to the problem of one or more housing bosses engaging the adjacent friction material stator disc and effecting damage thereto. The presence of the recess, either in the form of one or more pockets or a continuous annular groove or recess of sufficient radial dimension, enables the overall axial length of the heat stack to be maximized in the heat stack envelope, thereby maximizing the predicted number of landings per overhaul. Additionally by providing a recess having an appropriately sized radial dimension, the use of longer pistons is enabled and results in a desirable longer piston stroke.

We claim:

1. An aircraft brake assembly with increased wearable friction material, comprising a torque tube connected with a piston housing, a heat stack comprising friction material stator discs connected with the torque tube and friction material rotor discs for connection with a wheel, and the piston housing including a plurality of pistons for direct engagement with an adjacent friction material stator disc and a piston housing axial extension extending from the piston housing toward the adjacent friction material stator disc, the adjacent friction material stator disc including a recess for receiving the axial extension of the piston housing, the recess comprising a radially extending surface bounded in section view by radially spaced-apart axially extending edges of the recess, whereby an overall axial length of the heat stack, as compared to an aircraft brake assembly having said axial extension and a heat stack including an adjacent friction material stator disc without said recess, is increased to provide additional wearable friction material.

2. The brake assembly in accordance with claim 1, wherein the piston housing axial extension comprises a boss having at least one fluid passage terminating thereat.

3. The brake assembly in accordance with claim 2, wherein the recess comprises an annular groove within said adjacent friction material stator disc, the groove defined by the radially extending surface and two separate radially spaced-apart axially extending edges.

4. The brake assembly in accordance with claim 3, wherein the piston housing includes a plurality of piston housing axial extensions each of which is received within said annular groove.

5. The brake assembly in accordance with claim 3, wherein said annular groove includes a radial width sufficient to receive ends of the pistons of said piston housing whereby the length of each piston and associated piston travel, as compared to pistons and asociated piston travel of an aircraft brake assembly having said axial extension and a heat stack including an adjacent friction material stator disc without said groove, is increased.

6. The brake assembly in accordance with claim 2, wherein said recess comprises a pocket within said adjacent stator disc and which receives therein the axial extension.

7. The brake assembly in accordance with claim 6, wherein the piston housing includes a plurality of piston housing axial extensions each having an end of at least one fluid passage terminating thereat, and the adjacent friction material stator disc includes a plurality of circumferentially aligned pockets each aligned with an associated housing axial extension.

* * * * *